United States Patent
Garfinkle

(10) Patent No.: US 7,538,674 B2
(45) Date of Patent: May 26, 2009

(54) SENSE AND RESPOND RFID DISK PURGE FOR COMPUTING DEVICES

(75) Inventor: Steven M. Garfinkle, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 11/334,715

(22) Filed: Jan. 18, 2006

(65) Prior Publication Data

US 2007/0192869 A1 Aug. 16, 2007

(51) Int. Cl.
*G08B 13/14* (2006.01)
(52) U.S. Cl. .................... 340/572.1; 235/375; 726/26; 726/16
(58) Field of Classification Search ... 340/572.1–572.9; 235/375; 726/26, 16
See application file for complete search history.

(56) References Cited

U.S. PATENT DOCUMENTS

| | | | |
|---|---|---|---|
| 5,595,530 A | | 1/1997 | Heidelberger |
| 5,748,084 A | * | 5/1998 | Isikoff ..................... 340/568.1 |
| 5,874,902 A | | 2/1999 | Heinrich et al. |
| 5,936,526 A | | 8/1999 | Klein |
| 6,201,474 B1 | | 3/2001 | Brady et al. |
| 6,370,402 B1 | * | 4/2002 | Hakomori ................ 455/550.1 |
| 7,047,426 B1 | * | 5/2006 | Andrews et al. ............ 713/155 |
| 7,159,120 B2 | * | 1/2007 | Muratov et al. ............. 713/182 |
| 2002/0162011 A1 | | 10/2002 | Tanaka et al. |
| 2003/0005316 A1 | | 1/2003 | Girard |
| 2003/0065934 A1 | * | 4/2003 | Angelo et al. ............... 713/200 |
| 2003/0097596 A1 | | 5/2003 | Muratov et al. |
| 2003/0182435 A1 | | 9/2003 | Redlich et al. |
| 2004/0267944 A1 | * | 12/2004 | Britt, Jr. ..................... 709/229 |
| 2006/0090038 A1 | * | 4/2006 | Jung et al. .................. 711/135 |
| 2006/0101190 A1 | * | 5/2006 | McLean ..................... 711/100 |
| 2007/0069852 A1 | * | 3/2007 | Mo et al. ..................... 340/5.1 |

FOREIGN PATENT DOCUMENTS

WO   WO 0106507 A1   1/2001

* cited by examiner

*Primary Examiner*—George A Bugg
*Assistant Examiner*—Edny Labbees
(74) *Attorney, Agent, or Firm*—Scully, Scott, Murphy & Presser, P.C.; Derek S. Jennings

(57) ABSTRACT

A system, method and computer program product for purging contents of a data storage device provided in a computing device. The system is an RFID-based system comprising: an RFID device provided in the computing device and adapted for receiving and sending RFID signals, and in response to receipt of an RFID signal, the device generating an activation signal representing an instruction to purge contents of data storage device contents; and, a control means responsive to the activation signal received from the RFID device for invoking logic to initiate a physical purge of contents of the data storage device. By applying GPS and RFID object movement can be detected and alerts triggered and data signals generated that invokes logic to yield a disk or data purge thus ensuring that a compromised computing device has no recoverable or accessible data.

18 Claims, 3 Drawing Sheets

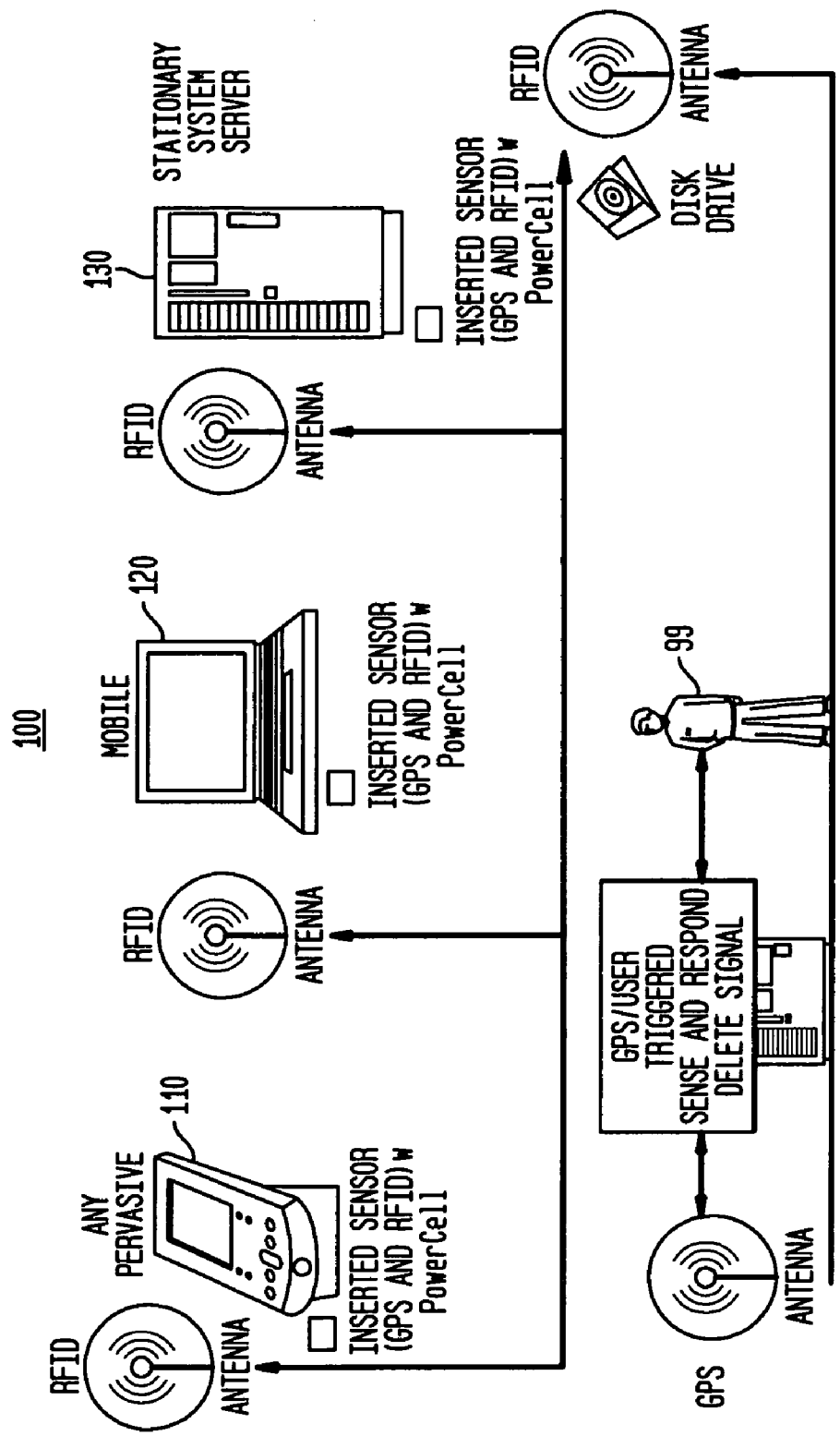

SENSE AND RESPOND RFID DISK PURGE FOR COMPUTING DEVICES

FIELD OF THE INVENTION

This invention relates generally to the field of data security and identity theft, and particularly, an RFID technology-based sense and respond process that wipes data off of a storage medium, e.g., a disk drive, when the computer system is compromised, e.g., stolen.

BACKGROUND OF THE INVENTION

All computer users face data security problems. For example, when a computer is compromised, e.g., stolen, the data on the disk drive(s) remain intact. When a computer is stolen, the disk drive can be accessed allowing personal, confidential, business and financial data to be obtained by the wrong persons including passwords and connections to various systems.

It would be highly desirable to provide a system and method that relates directly to the growing problems in computer security, identity theft, fraud, and terrorism. As the computer user base grows, the problem grows exponentially. More and more computer users are at risk whenever they store confidential information on computer hard drives . . . and are no longer in possession of these systems.

Representative conventional RFID-based and non-RFID based solutions for maintaining data integrity in and security of computing devices include: U.S. Pat. Nos. 5,874,902; 5,936,526; 5,959,530; 6,201,474; U.S. Patent Publication Nos. 2002/0162011; 2003/0005316; 2003/0182435; and, WO0106507(A1). However, these do not provide for a data purge initiation in a computer-related device based on receipt of a request, or satisfaction of rules or criteria that determine device tampering or removal.

It would be highly desirable to provide an RFID technology-based detection system implemented in a computer or computer-related device that, upon automatic detection or sensing of a triggering condition or event, or upon manual initiation, will initiate functionality to immediately wipe or purge the data off of any disk drives.

BRIEF SUMMARY OF THE INVENTION

The present invention implements both sense and respond technology with RFID to determine and manage disk (or other storage media) purges, and additionally provides authorized users with the ability to trigger a disk data purge in a computer or computer-related device.

Particularly, an RFID technology-based detection system is provided that, upon detection of triggering condition, will initiate functionality to immediately wipe the data off of disk drives in a computer or computer-related device. The method and apparatus enables triggering of a sense and respond RFID call to instantly purge the drives. Particularly, a Sense and Respond RFID process is implemented that erases or purges the data off disk drives. This Sense and Respond RFID process is based on triggering a sense and respond RFID call to instantly purge the drives.

According to the invention, there is provided a system, method and computer program product for purging contents of a data storage device provided in a computing device. The system is an RFID-based system comprising: an RFID device provided in the computing device and adapted for receiving and sending RFID signals, and in response to receipt of an RFID signal, the device generating an activation signal representing an instruction to purge contents of data storage device contents; and, a control means responsive to the activation signal received from the RFID device for invoking logic to initiate a physical purge of contents of the data storage device.

In one embodiment, a data purge is initiated automatically upon detection of a triggering event.

In another embodiment of the invention, an RFID signal is initiated by a user that is remotely located from the computing device.

In a further embodiment of the invention, the computing device includes a satellite navigation receiver configured for receiving position determining signals from a satellite based navigation system and determining a position of the computer device; and, a means for comparing the determined position with a predetermined position, wherein a detected triggering event including a determination that a location of said computer device has changed relative to the predetermined position.

Advantageously, the system need not be powered in the normal fashion, a power cell inserted into the system will drive the process. In addition, once the system is turned on, a purge can also occur. This "Sense and Respond" initiation can be either triggered by the computer user, e.g., owner, remotely or by location detection using a satellite based navigation system (e.g., GPS).

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 2 is a conceptual diagram detailing operation of the Sense and Respond RFID Disk Purge system 10 according to the present invention;

DETAILED DESCRIPTION OF THE INVENTION

Figure 1:
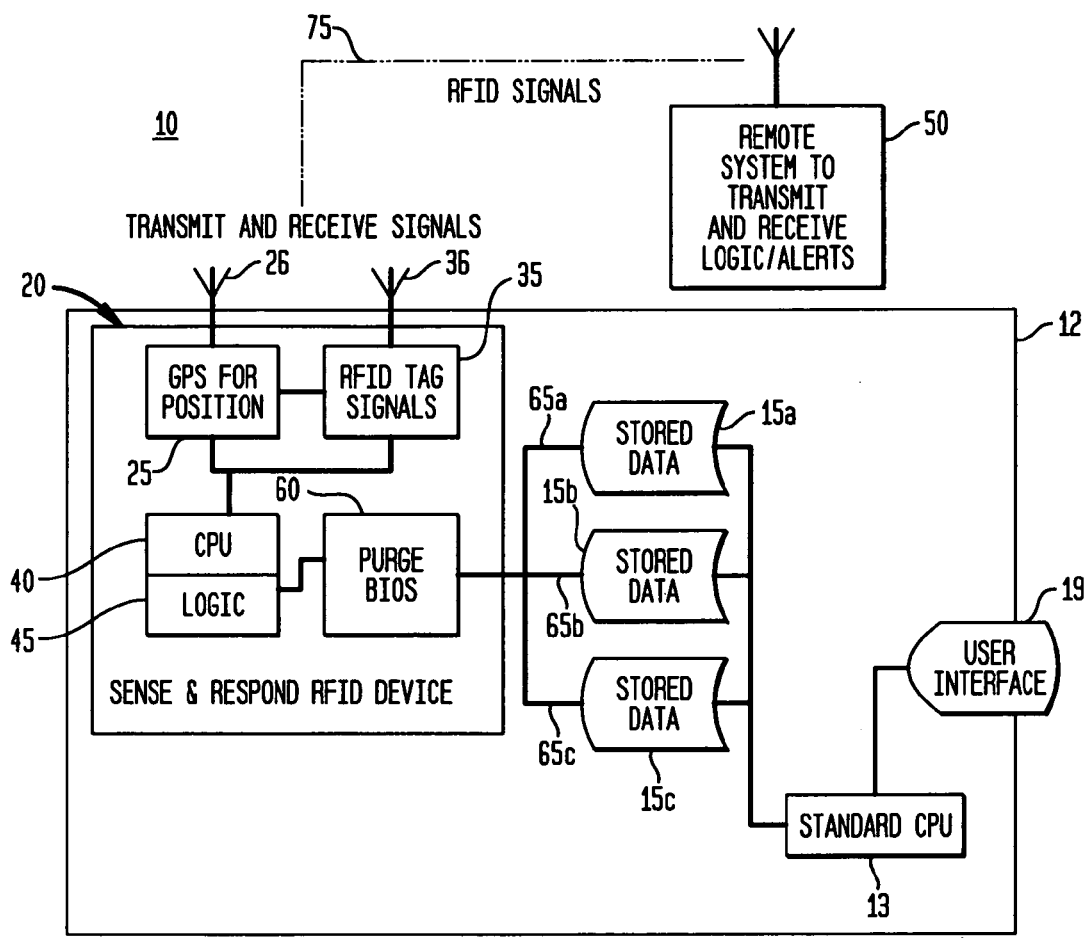
FIG. 1 is a general schematic diagram of a computer related device 12 having Sense and Respond RFID Disk Purge capabilities according to the invention.

The invention provides for the physical purging of data on a media storage device that can be initiated through an RFID Sense and Respond process triggered by an owner of the computing device having the media storage unit(s) either via a server or by a satellite based (e.g., GPS) location detection of the device. Thus, the invention helps to ensure that a system's data does not fall into the wrong hands or is used for nefarious purposes. Aspects of the invention will be described with reference to FIG. 1, which is a general schematic diagram of a computer related device 12 having Sense and Respond RFID Disk Purge capabilities according to the invention. Particularly, a computing device 12, which may represent any stationary or mobile computing device (e.g., laptop, notebook, personal computer, server, etc.) includes a central processing unit (CPU) 13 executing an operating system program, e.g., Windows, Linux or like variants, and a user interface (e.g., display) device 19, and, additionally includes potentially sensitive or confidential information stored in a data storage media, such as hard disk drives 15a, . . . , 15c that is physically part of the computing device. This device is implemented with a Sense and Respond RFID module 20 for initiating the purge functionality according to the invention.

The Sense and Respond RFID device 20 particularly includes an RFID Tag device, referred to herein as an RFID transponder 35, for transmitting and receiving interrogation signals from a remote system 50 that includes an RFID interrogator device and/or like device adapted for communicating RFID and other signals, e.g., via antenna device 36.

That is, the RFID interrogator device includes a transceiver, decoder and antenna configured to emit a signal that activates the RFID tag so it can read data from and write data to the RFID transponder 35. While typically a passive device (i.e., RFID transponder 35 absorbs energy to power its circuitry from the received interrogation signals), the transponder may be configured to be a read-only or a read/write type and may have a battery or like power supply source (not shown). The RFID transponder device 35 may be fabricated as an ASIC on a single silicon chip including a receiver/transmitter and controller circuitry along with an associated attached memory device. The memory stores an identification code, or other data related to the particular computing device to which it corresponds. The transponder may alternately comprise a collection of integrated components: tag, antenna, logic for reader and controller, requisite software systems, etc.

The Sense and Respond RFID device 20 additionally includes a global positioning system (GPS) receiver device 25 for receiving satellite data signal transmissions via a suitable antenna device 26, e.g., GPS signals (not shown), and, as known in the art, includes processing functionality for determining the location of the computing related device 12 from the satellite data signal transmissions received. It is appreciated that receiver device 25 may comprise any satellite navigation system receiver device employed for receiving signals from three or more satellites implemented in satellite navigation systems such as GPS, GLONASS, and Galileo and like satellite-based transmission signals and for determining location or position coordinates (e.g., latitude and longitude) of the computing device 12. In the preferred embodiment, position coordinate data of the device 12 may be determined by processing in the receiver device 25 itself, or by the CPU device 40 coupled to the receiver 25.

Controlling operation of the Sense and Respond RFID device 20 generally and the satellite-based positioning receiver is a microcontroller device or CPU 40 having an associated memory for storing logic 45 (e.g., rules) implementing the functionality for RFID Sense and respond and purge functionality as will be described in greater detail herein with respect to FIG. 3.

In typical operation, in response to receiving an interrogation signal 75, the microcontroller or CPU 40 is enabled to perform control and data processing for the Sense and Respond RFID device 20 according to programmed logic 45. In one embodiment, transponder device 35 and may initially transmit an identification code and/or other data from its memory back to the remote interrogating system 50, or other transponder devices. This is performed in combination with software logic in combination with a Sensor/Actuator (used for external inputs and outputs) and is required to alert instructions to systems and devices to trigger events, such as processes to purge data, or initiate other remote triggers to incite actions, thus delivering sense and respond scenarios. More particularly, as will be described in greater detail herein below, according to the invention, the RFID transponder 35 is further configured to send an "action" signal to another transponder or other devices to perform certain functions. In the context of the invention, an "action" signal is generated to execute a purge/deletion of all data on connected hard disk drives 15a, . . . , 15c via respective signal lines 65a, . . . , 65c. Thus, for instance, as shown in FIG. 1, the logic executed by microcontroller 40 will automatically activate a "purge BIOS" module 60 that interfaces with the computing device's operating system to initiate performance of functions to purge, erase, or otherwise delete all of the data included on a disk drive. More particularly, the purge (basic input/output system) BIOS module 60 executes logic to initiate a physical "wipe" of the hard disk storage, i.e., physically clean the disks (and perhaps physically destroy the disks), this logic being stored at the physical level and ensures a physical delete. Since the logic is at the BIOS level it can not be modified at a software level and may be initiated outside of the normal operating system.

In the conceptual diagram depicting the operation of the Sense and Respond RFID Disk Purge system 100 of FIG. 2, a Sense and Respond Radio Frequency Identification (RFID) device 20 of FIG. 1 may be implemented in computing devices including, but not limited to: a pervasive devices 110 (e.g., a personal digital assistant or PDA), a mobile device 120 (e.g., laptop or notebook computer), system server devices 130, etc. Each pervasive device 110, mobile device 120, or system server device 130 includes a respective RFID Tag antenna for receiving a sense and respond RFID interrogation that initiates functionality for instantly purging data contained in the hard disk drives of the respective computing device. Particularly, a "Sense and Respond" initiation can be either triggered by an authorized computer user 99 remotely, or by location detection using the satellite-based navigation system (e.g., GPS). Preferably, in response to an interrogation by an authorized computer user 99 or, by automated means as will be described in greater detail hereinbelow, the Sense and Respond RFID device 20 initiates, by activating the Purge BIOS module 60, a purge drive process that physically removes data on the hard disk by over-writing the entire disk. A second step can be implemented to render the disks unusable, e.g., by initiating a command to drop the head directly on the media and essentially scratching the media to damage the drive so a combination of overwrites and physical damage render the media physically unusable and data unrecognizable.

Figure 3A:
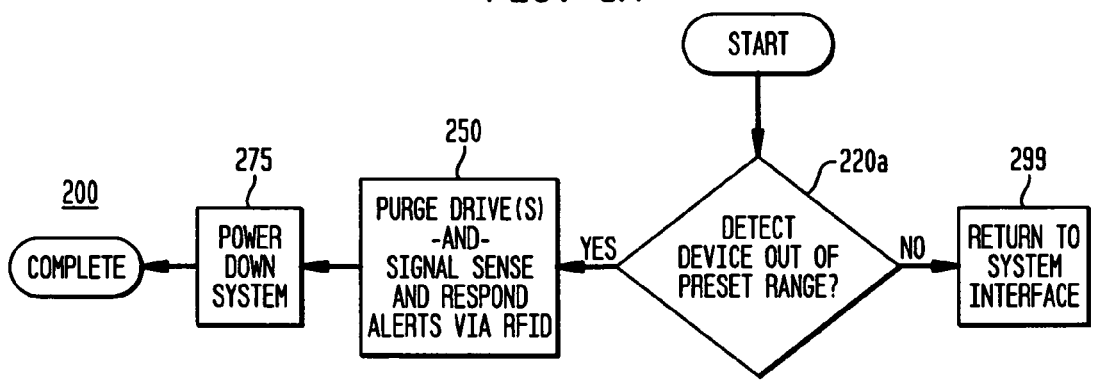
FIGS. 3A-3C illustrate a flow chart depicting the methodology implemented by the Sense and Respond RFID Disk Purge system 10 according to the invention.
Figure 3B:
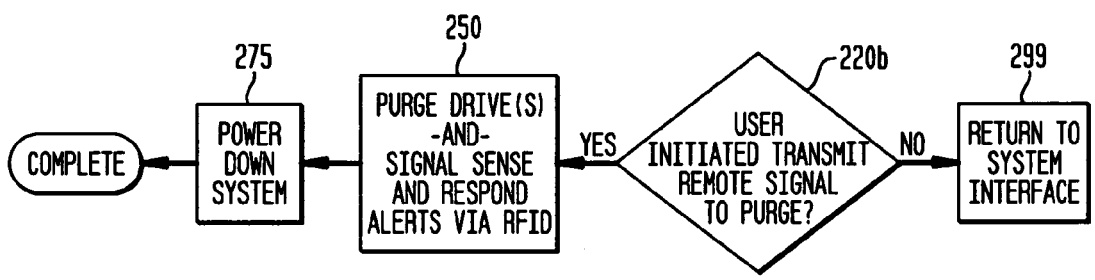
Figure 3C:
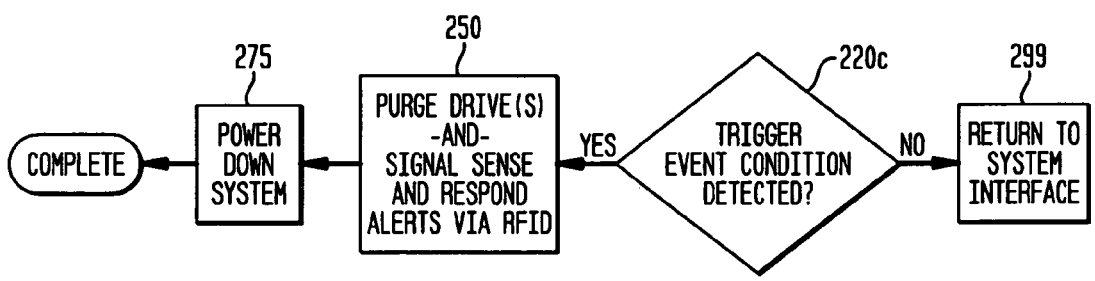

FIGS. 3A-3C denote a process 200 implemented by the logic executed by the CPU 40 in the Sense and Respond RFID device 20, or, alternatively, logic executed by the device CPU 13 (as shown in FIG. 2) of each computer related device 12. As shown in FIG. 3A, in a first step 220a, the device implements logic for evaluating a disk(s) data purge trigger condition based on received satellite navigation system data received by the GPS receiver. For example, if a determination is made that the device position of the device 12 has changed in relation to a preset location or origin, or is outside a predetermined range or radius, then a disk purge is initiated as depicted at step 250. That is, a location or position (coordinates) are determined based on signals received via the satellite navigation system and logic is implemented by the CPU 40 in the Sense and Respond RFID device 20 to determine if the calculated determined location is outside a preset location relative to an origin programmed into the device, for example. Upon determining that the position of the device has moved, the disk purge is initiated and, appropriate signal sense and respond alerts are generated via the Sense and Respond RFID device 20. Continuing in FIG. 3A, a next step 275 may include powering down the system components. It should be understood that the activation of the satellite based (e.g., GPS) receiver device for receiving satellite system based signals and calculating position/location coordinates may be automated, e.g., periodically, or initiated by a user, or both. As further shown in FIG. 3A, if the computing device is not detected to be out of a preset range at step 220*a*, the system is returned back to its current state at step 299, i.e., the system continues to function as normal with the end-user not noticing any change.

Likewise, as shown in FIG. 3B, at step 220*b*, the device implements logic for evaluating a disk(s) data purge trigger condition based on a user initiated purge request signal. That is, a user may remotely initiate transmission of a purge request signal via the remote system 50 that includes an RFID interrogator device and/or like device adapted for communicating RFID and other signals, e.g., via antenna device 36 (see FIG. 1). Upon receipt of a data purge request signal via the RFID interrogator device and/or like device 50, a disk purge is initiated by generating the appropriate sense and respond action signals via the Sense and Respond RFID device 20. Continuing in FIG. 3B, a next step 275 may include powering down the system components. As further shown in FIG. 3B, if no remote data disk purge request signal has been received at step 220*b*, the system is returned back to its current state at step 299, i.e., the system continues to function as normal with the end-user not noticing any change.

Furthermore, as shown in FIG. 3C, at step 220*c*, the computing device implements logic for determining an event or condition warranting a disk(s) data purge. That is, in step 220*c*, the device implements logic for determining or evaluating a trigger condition for initiating a memory erase, i.e., hard disk(s) data purge(s). Trigger condition criteria for initiating a hard disk data purge include, but is not limited to, the following criteria: 1) a user initiated transmit remote signal to purge; 2) detection of an invalid system password entry, or detecting a number of log-in attempts exceeding a threshold number of tries; 3) detection of an invalid search password, or detecting a number of invalid search attempts exceeding a threshold number of tries; 4) detection of invalid random usage of a password, or detecting a number of invalid random usage attempts exceeding a threshold number of tries; 5) detection of a long running task to scan any cookies residing in memory; 6) detection of invalid long running task password, or detecting a number of invalid long running task password attempts exceeding a threshold number of tries; 7) detection of meeting a user defined security criteria, or detection of exceeding a number of attempts to circumvent a user defined security criteria; 8) detection of a long running task to scan any cookies residing in memory; 9) detection of an attempt or a number of attempts exceeding a number of tries threshold to remove the hard drive itself; or, 10) detection of a user having unauthorized registry access. In each instance, upon detection of a purge trigger event, disk data purge(s) is (are) initiated by generating the appropriate signal sense and respond action signals via the Sense and Respond RFID device 20, i.e., an RFID signal is used to initiate the purge process. Continuing in FIG. 3C, a next step 275 may include powering down the system components. As further shown in FIG. 3C, if no purge trigger event or condition has been detected at step 220*c*, the system is returned back to its current state at step 299, i.e., the system continues to function as normal with the end-user not noticing any change.

Thus, it is within the scope of the invention that any detectable criteria or patterns may initiate a disk data purge(s). That is, any given event that can be "sensed" by the system and initiate a "response" to either correct a situation or protect a resource, is contemplated. Other events include occurrences such as detected tampering, theft, vibrations, temperature changes, and even detection of human conversation and movement in proximity to the device, i.e., such events that can be sensed using the apparatus with responses signaled using RFID to invoke remote services in order to initiate the purge drive process. Additional criteria or patterns include: 1) implementation of user defined questions/answers; 2) detection of executing of password cracking software (storing process names); 3) detection of executing keystroke logging software; 4) detection of login spoofing; 50 detection of decryption attempts; and, detection of dictionary attacks, for instance:

Applying the technology of the invention to software logic, sense and response signals are used to initiate a disk purge based on system provided criteria. By applying GPS and RFID, object movement can be detected and alerts triggered and through data signals, logic can be invoked to yield a disk or data purge thus ensuring a compromised device has no recoverable or accessible data. The logic executed within such devices 12 interpret transmitted or received signals and then triggers automated processes to yield disk purge results.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. An RFID-based data purge system for a host computing device having a storage device operatively associated therewith, said system comprising:

an RFID device provided in said host computing device and provided in other computing devices for receiving and sending RFID signal;

means for automatically detecting a triggering event associated with said host computing device, said trigger event comprising detection of a physical removal of said storage device from said host computing device, said detecting means initiating, without manual intervention, automatic purging of content of said data storage device by automatically generating, via said RFID device, an RFID activation signal including an identification code representing an instruction to purge contents of said data storage device contents; said RFID device allows detection of a remote triggering event via wireless RF signal;

control means responsive to said RFID activation for invoking logic to initiate a physical purge of contents of said data storage device, said control means including a purge BIOS module executing logic stored at a physical level of said storage device to ensure a physical delete of said storage device contents; and said RFID device at said host computer generating further RFID activation signals for communication to said other computer devices via said RFID device of said host computing device, said further RFID activation signals for receipt by said other computing devices to initiate purging of stored contents at said other computing devices; and, wherein said data storage device and said other computing devices each comprise a power supply device operable for powering said RFID device and said purge BIOS module such that said physical purge of data storage device contents is performed when said storage device is removed from said host computing device or, is performed when said host computing device is not powered.

2. The system as claimed in claim 1, wherein said one RFID signal is initiated by a user that is remotely located from said computing device.

3. The system as claimed in claim 1, wherein said computing device further comprises:

a satellite based navigation position receiver configured for receiving position determining signals from a satellite based navigation system and determining a position of said computer device; and, means for comparing said determined position with a predetermined position data stored in said device, wherein said activation signal representing an instruction to purge contents of data storage device is generated in response to a determination that a location of said computer device has changed relative to said predetermined position.

4. The system as claimed in claim 1, wherein a detected trigger event comprising satisfaction of a predetermined criteria.

5. The system as claimed in claim 4, wherein a predetermined criteria includes:

detection of an invalid system password entry, or detecting a number of log-in attempts exceeding a threshold number.

6. The system as claimed in claim 4, wherein a predetermined criteria includes:

detection of an invalid search password, or detecting a number of invalid search attempts exceeding a threshold number.

7. The system as claimed in claim 4, wherein a predetermined criteria includes:

detection of an invalid search password, or detecting a number of invalid search attempts.

8. The system as claimed in claim 4, wherein a predetermined criteria includes:

detection of meeting a user defined security criteria, or detection of exceeding a number of attempts to circumvent a user defined security criteria.

9. The system as claimed in claim 4, wherein a predetermined criteria includes:

detecting an occurrence of one or more of: computer device tampering, theft, vibration, a temperature change, or detection of human conversation and movement in proximity to the computing device.

10. The system as claimed in claim 1, wherein a computing device comprises one or more of: a pervasive digital device, a laptop computer, a notebook computer, a personal computer, or a server device.

11. A method for purging content of a data storage device provided in a host computing device, said method comprising:

providing an RFID device in said host computing device adapted for receiving and sending RFID signals;

providing said RFID device in other computing devices for receiving and sending RFID signals;

automatically detecting a triggering event associated with said host computing device, said trigger event comprising detection of a physical removal of said storage device from said host computing device; and, automatically initiating, without manual intervention, automatic purging of content of said data storage device by generating, via said RFID device, an RFID activation signal including an identification code representing an instruction to purge contents of data storage device; said RFID device allows detection of a remote triggering event via wireless RF signal; and, activating a purge BIOS module that executes logic stored at a physical level of said data storage device to initiate and ensure a complete physical purge of said data storage device contents based upon a received said RFID activation signal;

generating, at said host computer, further RFID activation signals for communication to said other computing devices having said RFID device, said further activation signals for receipt by said other computing devices to initiate automatic purging of stored contents at said other computing devices; and, powering, at each said data storage device and said other computing device, each said RFID device such that said physical purge of data storage device contents is performed when said storage device is physically removed from said host computing device or, is performed when said host computing device is not powered.

12. The method as claimed in claim 11, further including: enabling a user to initiate generation of an RFID signal for receipt by said RFID device while remotely located from said computing device.

13. The method as claimed in claim 1, further comprising: receiving position determining signals from a satellite based navigation system to determine a position of said computer device; and, comparing said determined position with a predetermined position data stored in said device, said activation signal representing an instruction to purge contents of data storage device being generated in response to a determination that a location of said computer device has changed relative to said predetermined position.

14. The method as claimed in claim 1, wherein a detected trigger event comprises satisfaction of a predetermined criteria.

15. The method as claimed in claim 14, wherein a predetermined criteria includes:

detecting an invalid system password entry, or detecting a number of log-in attempts exceeding a threshold number.

16. The method as claimed in claim 14, wherein a predetermined criteria includes one of: detecting an invalid search password, or detecting a number of invalid search attempts exceeding a threshold number, or detection of meeting a user defined security criteria, or detection of exceeding a number of attempts to circumvent a user defined security criteria.

17. The method as claimed in claim 14, wherein a predetermined criteria includes:
   detecting an occurrence of: computer device tampering, theft, vibration, a temperature change, or detection of human conversation and movement in proximity to the computing device.

18. A computer program product comprising a computer usable medium including computing usable program code for purging content of a data storage device provided in a host computing device, said computer program product including;
   computer usable program code for adapting an RFID device in said computing device for receiving and sending RFID signals;
   computer usable program code for providing said RFID device in other computing devices for receiving and sending RFID signals;
   computer usable program code for automatically detecting a triggering event associated with said host computing device, said trigger event comprising detection of a physical removal of said storage device from said host computing device;
   computer usable program code for automatically initiating, without manual intervention, automatic purging of content of said data storage device by generating, via said RFID device, an RFID activation signal including an identification code representing an instruction to purge contents of data storage contents; said RFID device allows detection of remote triggering event via wireless RF signal; and,
   computer usable program code for activating a purge BIOS module that executes logic stored at a physical level of said data storage device to initiate a physical purge of said data storage device contents based upon a received said RFID activation signal,
   computer usable program code for generating, by said host computer, further RFID activation signals for communication to said other computing devices having said RFID device, said further RFID activation signals for receipt by said other computing devices to initiate automatic purging of stored contents at said other computing devices;
   wherein said RFID device at each said data storage device and said other computing devices, is powered such that said physical purge of data storage device contents is performed when said data storage device is physically removed from said host computing device, or, is performed when said host computing device is not powered.

* * * * *